United States Patent
Langezaal et al.

(10) Patent No.: US 7,866,090 B2
(45) Date of Patent: Jan. 11, 2011

(54) METHOD FOR CULTIVATING PLANTS AS WELL AS A CULTURE MEDIUM

(75) Inventors: Lucas Everhardus Maria Langezaal, Berja (ES); Johannes Cornelis Jonker, Capelle aan den IJssel (NL)

(73) Assignee: Lucas Everhardus Maria Langezaal, Berja (ES)

( * ) Notice: Subject to any disclaimer, the term of this patent is extended or adjusted under 35 U.S.C. 154(b) by 260 days.

(21) Appl. No.: 11/995,306

(22) PCT Filed: Jul. 20, 2006

(86) PCT No.: PCT/NL2006/050184

§ 371 (c)(1),
(2), (4) Date: Jan. 10, 2008

(87) PCT Pub. No.: WO2007/011225

PCT Pub. Date: Jan. 25, 2007

(65) Prior Publication Data

US 2008/0250711 A1 Oct. 16, 2008

(30) Foreign Application Priority Data

Jul. 20, 2005 (NL) .................................. 1029571

(51) Int. Cl.
*A01C 1/06* (2006.01)
(52) U.S. Cl. .................................................. 47/58.1 R
(58) Field of Classification Search ............... 47/77, 47/1.01 P, 901
See application file for complete search history.

(56) References Cited

U.S. PATENT DOCUMENTS

| | | | | |
|---|---|---|---|---|
| 4,131,662 A | * | 12/1978 | Cekoric et al. | 264/51 |
| 4,221,749 A | * | 9/1980 | Dedolph | 264/45.3 |
| 4,278,625 A | * | 7/1981 | Dedolph | 264/39 |
| 4,422,990 A | * | 12/1983 | Armstrong et al. | 264/45.3 |
| 4,609,511 A | * | 9/1986 | Fischer et al. | 264/51 |
| 5,093,130 A | * | 3/1992 | Fujii et al. | 424/463 |
| 7,117,634 B2 | * | 10/2006 | Pelton | 47/77 |
| 7,153,456 B2 | * | 12/2006 | Wilson | 264/39 |
| 2004/0045217 A1 | | 3/2004 | Chiddick et al. | |
| 2004/0049980 A1 | * | 3/2004 | Principe et al. | 47/64 |
| 2004/0103705 A1 | * | 6/2004 | Maria Langezaal | 71/27 |
| 2004/0235168 A1 | * | 11/2004 | Langezaal | 435/404 |
| 2006/0248795 A1 | * | 11/2006 | Langezaal | 47/58.1 R |
| 2008/0250711 A1 | * | 10/2008 | Everhardus Lucas Langezaal et al. | 47/77 |

FOREIGN PATENT DOCUMENTS

| | | | | |
|---|---|---|---|---|
| JP | 06245652 A | | 6/1994 | |
| JP | 406245652 A | * | 9/1994 | 47/65.7 |
| JP | 07203773 A | | 5/1995 | |
| NL | 1023354 C2 | | 8/2004 | |

* cited by examiner

*Primary Examiner*—Francis T Palo
(74) *Attorney, Agent, or Firm*—Bret E. Field; Bozicevic, Field & Francis LLP

(57) ABSTRACT

A method for cultivating plants, wherein use is made of a multitude of cells, each comprising a container having a cylindrical or frustoconical inner side wall, which container is open at the upper side, wherein the containers are filled with a growth substrate containing a seed, and wherein a layer of powder is applied to the inner side walls of the containers before the growth substrates are placed in the containers.

30 Claims, 2 Drawing Sheets

METHOD FOR CULTIVATING PLANTS AS WELL AS A CULTURE MEDIUM

The invention relates to a method for cultivating plants, wherein use is made of a multitude of cells, each comprising a container having a cylindrical or frustoconical inner side wall, which container is open at the upper side, wherein the containers are filled with a growth substrate containing a seed. Within the context of this invention, the terms cylindrical or frustoconical are to be understood to include also prismatic and frusto-pyramidal.

Examples of such methods are described in NL 1017460 and NL 1023354. A problem that may occur when such a method is used is that the growth substrate falls apart upon being removed from the container when the plants are to be transferred to a larger cultivating bed, that parts of the substrate remain behind or that much force must be used for removing the substrate. This may lead to damage to the plant roots. It is known to spray a release agent exhibiting a repelling action on the container walls. The effect of the release agent, however, strongly depends on the composition of the substrate and the container, and in case of a slightly different composition the effect may be significantly less. Thus, the substrate may contain a specific fertilizer, for example, which causes the release agent to lose its effect.

The object of the invention is to provide a simple, inexpensive and reliable method for cultivating plants, wherein the extent to which the young plants are damaged is minimised.

According to the invention, a layer of powder is applied to the inner side walls and the bottoms, if present, of the containers before the growth substrates are placed in the containers. Said powder forms a layer that does not adhere to the wall, as a result of which the substrates can be easily removed without pieces of substrate sticking to the wall or the bottom. The chemical composition of the substrate or the container does not affect the action of the insoluble powder. The releasing action of the powder is generally enhanced when the powder becomes moist.

The growth substrates are preferably made up of a soil mixture and a binder, such that each growth substrate forms a fixed unit (for example a block or a plug). Examples of this are also discussed in NL 1017460 and NL 1023354. The binder may be a glue or a foaming agent. When a binder is used, the above-described problem of adherence to the wall and the bottom generally plays an even larger part. According to the invention the unit is preferably formed by mixing the soil mixture (for example peat, sand, clay, compost, cocos granulate, cocos fibre, sawdust, paper pulp, straw, coffee grounds, grass residue, hemp fibre, rock wool or perlite) and the binder (for example a thermoplastic polymer such as polyolefins, polyurethane, polylactic acid, polyester amide, polyester fibre, mater-bi-polymer, EVA, polycaprolactone or thermoplastic starch) and placing the mixture in the cells, after which the cells are heated, such that the binder binds the soil mixture. The bond becomes stable upon cooling. As a result, also the powder particles will bond to the binder, such that the layer of powder will at least for the larger part remain adhered to the growth substrates upon removal of the growth substrates. Said layer of powder is porous, so that the plant roots can grow through it. Said heating preferably takes place by means of hot water vapour (steam), preferably for 3 to 120 seconds. A cold glue with a base of latex, acrylate, starch or polyurethane may be used as the binder, for example.

There are various ways of applying the powder. The powder may be applied by charging the inner side wall and the bottom electrostatically, so that the powder is attracted thereby. In the preferred embodiment, the powder is applied by means of an emulsion in which the powder is emulsified, with the emulsion being applied to the inner side walls and the bottoms, after which the emulsion is dried. The emulsion can be applied by spraying. The emulsion can also be applied by immersing the cells in the emulsion.

Preferably, the powder is evenly distributed over the wall, with the powder weakly adhering to the wall. This is achieved inter alia by the selection of the powder, the emulsion fluid and any additions.

The emulsion liquid is preferably water (for example when the container is made of polypropylene), a wax or a volatile liquid (for example when the container is made of polystyrene or extended polystyrene). The emulsion preferably contains a surface tension-reducing surfactant. The amount of surfactant ranges between 0.25 and 4 g/kg of emulsion, preferably between 0.75 and 1.50 g/kg of emulsion. Preferably, a pH-controller, such as BayerTM B-85 is furthermore added to the emulsion, with the amount and the nature of the pH-controller preferably being such that the pH of the emulsion is reduced to a value of 1-2.5, so that it will be approximately the same as the pH of the substrate. Furthermore, the emulsion preferably contains a stabiliser and/or a thickener, such as carboxymethyl cellulose.

Preferably, the powder particles are on average smaller than 200 µm, more preferably even smaller than 20 µm, most preferably smaller than 2 µm. The powder preferably comprises one or more substances from the group consisting of: clay (for example bentonite or illite), lime, talcum, perlite, peat powder, cellulose particles.

The amount of powder in the emulsion is preferably at least 10 wt. %, more preferably at least 20 wt. % most preferably about 30 wt. %. The thickness of the layer of powder on the inner side wall near the bottom is preferably at least 0.30 mm, more preferably at least 0.70 mm. In those cases in which the substrate remains behind in the container, this usually happens near the bottom. The thickness of the layer of powder is preferably maximally 1.5 mm.

The containers are preferably made of a plastic material, such as PP, PE, polyethylene or polystyrene, or combinations thereof. In the preferred embodiment, the containers are interconnected in such a way that they form a tray.

The invention also relates to a culture medium comprising cells, each comprising a container having a cylindrical of frustoconical inner side wall, which container is open at the upper side, wherein the containers are filled with a growth substrate containing a seed, and wherein the surfaces of the growth substrates that abut against the inner side walls of the containers are provided with a layer of powder.

The invention will now be explained in more detail on the basis of an embodiment illustrated in the figures, in which:

FIG. 1 schematically shows in perspective view the application of an emulsion to a culture medium;

Figure 1:
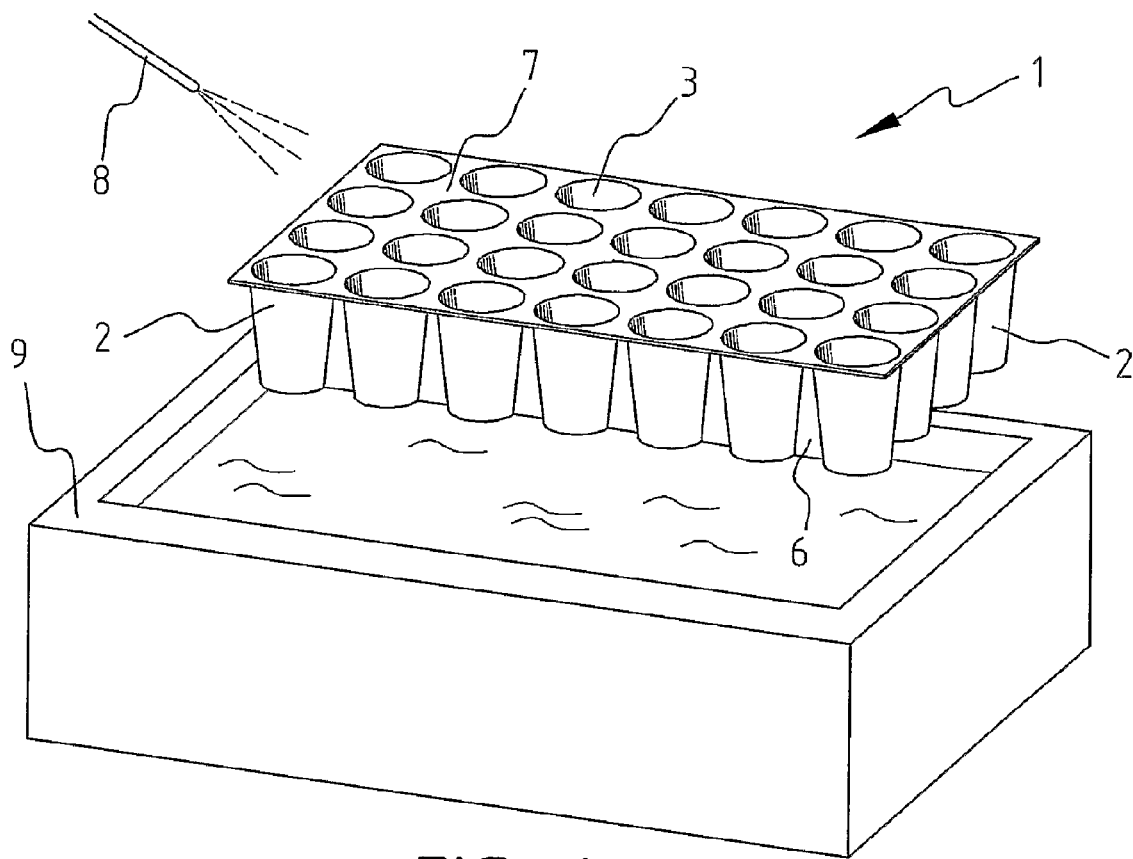
Figure 2:
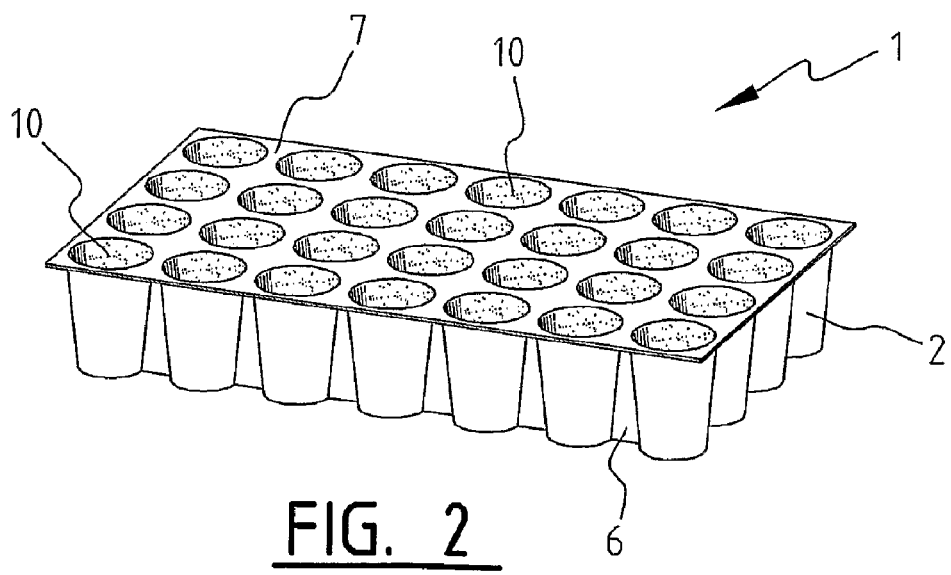
FIG. 2 is a perspective view of a culture medium that is provided with a powder.

FIGS. 1 and 2 show a tray 1 consisting of a plurality of containers 2 arranged in a rectangular matrix. The trade is made in one piece of plastic material. The containers 2 consist of a frustoconical side wall 3 and a bottom 4, which bottom is provided with a hole 5 (shown in FIGS. 4 and 5). The containers are interconnected by means of lateral flanges 6 and upper flanges 7.

According to FIG. 1, a layer of powder emulsion may be applied to the tray 1 by being sprayed thereon from above by means of an emulsion sprayer 8 or by immersing the tray 1 in an emulsion bath. After the emulsion has been applied, it is preferably allowed to dry before the containers 2 are filled. The powder may also be applied directly in dry form (not shown). The result is shown in FIG. 2, in which the powder 10 can be distinguished on the inner side wall of the containers. Depending on the method that is used, the powder 10 is also present on the outer side of the containers 2, where it has no function, however.

Figure 3:
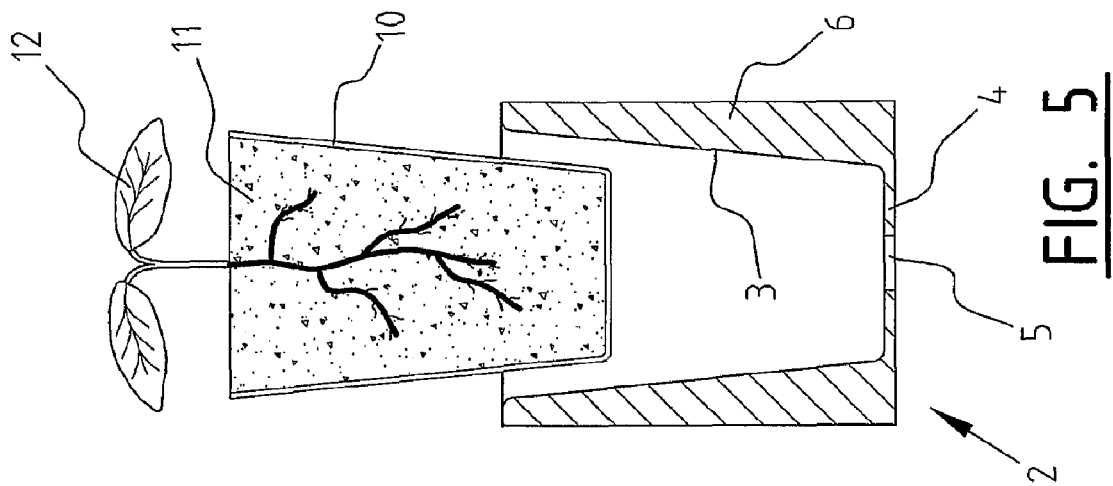
FIG. 3 is a perspective view of a container of the culture medium, which is filled with a substrate.
Figure 4:
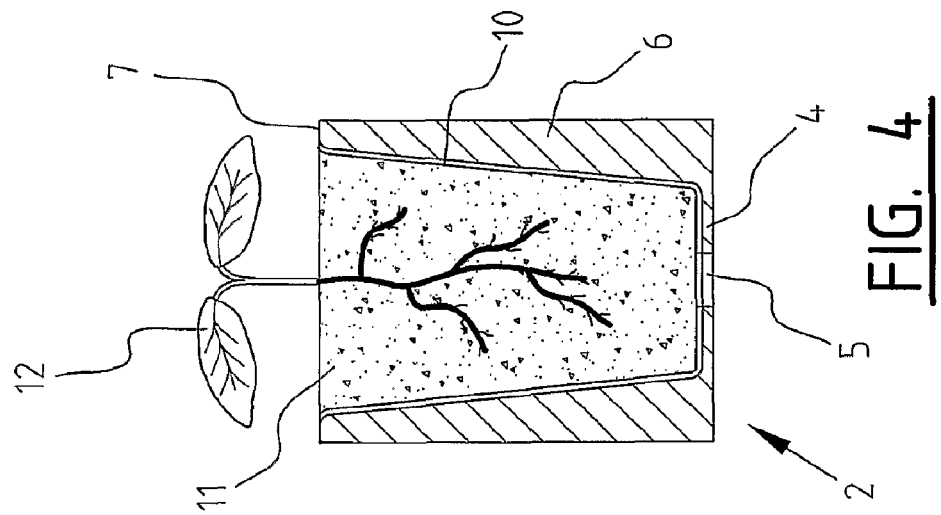
FIG. 4 is a sectional view of the container of FIG. 3.
Figure 5:
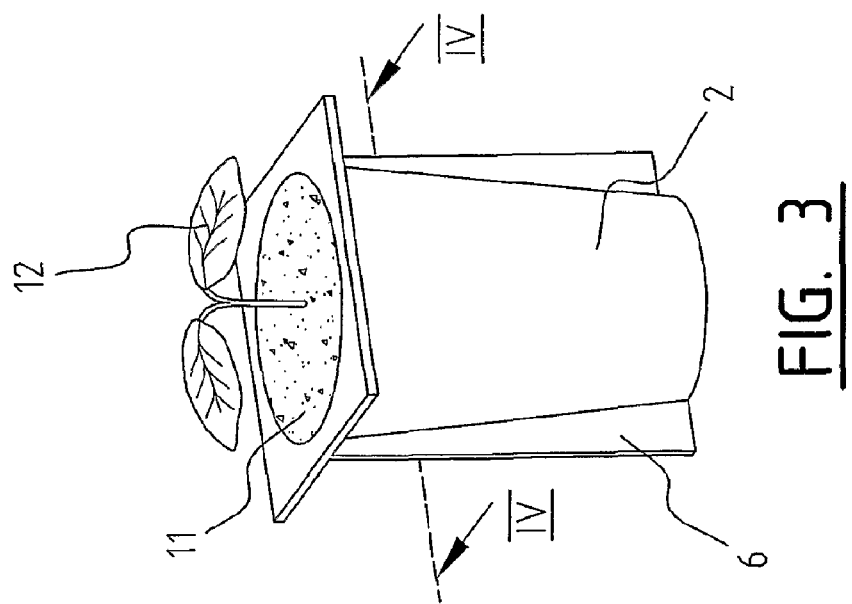
FIG. 5 is a sectional view of the removed substrate and the container.

FIGS. 3, 4 and 5 show a filled container 2, which is filled with a substrate 11 and a germinated plant 12. The substrate plug 11 is made of a mixture of soil and thermoplastic polymer granules, which has been heated for the purpose of melting the granules so as to form a consistent substance. Since said heating (to a temperature of 70-90° C.) takes place in the containers 2, the powder 10 will bond to the substrate plug 11 as well. In FIG. 5 the substrate plug 11 containing the plant 12 is removed from the container 2, with the bonded layer of powder 10 acting as a slide and release layer.

The invention claimed is:

1. A method for cultivating plants, wherein use is made of a multitude of cells, each comprising a container having a cylindrical or frustoconical inner side wall, which container is open at the upper side, wherein the containers are filled with a growth substrate containing a seed, characterised in that a layer of powder is applied to the inner side walls of the containers before the growth substrates are placed in the containers.

2. A method according to claim 1, wherein the growth substrates are made up of a soil mixture and a binder, such that each growth substrate forms a fixed unit.

3. A method according to claim 2, wherein the soil mixture and the binder are mixed and placed in the cells, after which the cells are heated, such that the binder binds the soil mixture.

4. A method according to claim 3, wherein the powder particles bond to the binder, such that the layer of powder will at least for the larger part remain adhered to the growth substrates upon removal of the growth substrates.

5. A method according to claim 3, wherein said heating takes place by means of water vapour.

6. A method according to claim 3, wherein said heating takes place for 3 to 120 seconds.

7. A method according to claim 3, wherein said heating is performed at about 70 to about 90° C.

8. A method according to claim 3, wherein said binder is a thermoplastic polymer.

9. A method according to claim 8, wherein said thermoplastic polymer comprises a polymer selected from the group consisting of polyolefin, polyurethane, polylactic acid, polyester amide, polyester fibre, mater-bi-polymer, EVA, polycaprolactone and thermoplastic starch.

10. A method according to claim 8, wherein said heating melts said thermoplastic polymer.

11. A method according to claim 1, wherein the powder is applied by charging the inner side wall and the bottom electrostatically.

12. A method according to claim 1, wherein the powder is applied by means of an emulsion in which the powder is emulsified, with the emulsion being applied to the inner side walls and the bottoms, after which the emulsion is dried.

13. A method according to claim 12, wherein the emulsion liquid is water, a wax or a volatile liquid.

14. A method according to claim 12, wherein the emulsion contains a surface tension-reducing surfactant.

15. A method according to claim 14, wherein the amount of surfactant ranges between 0.25 and 4 g/kg of emulsion.

16. A method according to claim 12, wherein a pH-controller is added to the emulsion.

17. A method according to claim 16, wherein the amount of the pH-controller is such that the pH of the emulsion is reduced to a value of 1-2.5.

18. A method according to claim 12, wherein a stabiliser and/or a thickener is added to the emulsion.

19. A method according to claim 12, wherein the emulsion is applied by spraying.

20. A method according to claim 12, wherein the emulsion is applied by immersing the cells in the emulsion.

21. A method according to claim 12, wherein the amount of powder in the emulsion is at least 10 wt. %.

22. A method according to claim 1, wherein the powder particles are on average smaller than 200 μm.

23. A method according to claim 1, wherein the powder comprises one or more substances from the group consisting of: clay, lime, talcum, perlite, peat powder, cellulose particles.

24. A method according to claim 1, wherein the thickness of the layer of powder on the inner side wall near the bottom is at least 0.30 mm.

25. A method according to claim 1, wherein the thickness of the layer of powder is maximally 1.5 mm.

26. A method according to claim 1, wherein the containers comprise a plastic material.

27. A method according to claim 1, wherein the containers are interconnected in such a way that they form a tray.

28. A method according to claim 1, wherein said powder forms a layer that does not adhere to said inner side walls.

29. A method according to claim 1, wherein said layer of powder is porous, such that plant roots can grow through said layer.

30. A culture medium comprising cells, each comprising a container having a cylindrical of frustoconical inner side wall, which container is open at the upper side, wherein the containers are filled with a growth substrate containing a seed, characterised in that the surfaces of the growth substrates that abut against the inner side walls of the containers are provided with a layer of powder.

* * * * *